United States Patent [19]

Marzio et al.

[11] Patent Number: 5,582,489
[45] Date of Patent: Dec. 10, 1996

[54] DEVICE FOR COUPLING TWO SHAFTS

[75] Inventors: Emmanuel Marzio, Vendome; Charles Daviau, Sarge sur Braye, both of France

[73] Assignee: NACAM, Vendome, France

[21] Appl. No.: 505,080

[22] Filed: Jul. 21, 1995

[30] Foreign Application Priority Data

Jul. 26, 1994 [FR] France .................. 94 09233

[51] Int. Cl.⁶ .................................. F16B 21/16
[52] U.S. Cl. .................. 403/354; 403/325; 403/316
[58] Field of Search .................. 403/348, 349, 403/315, 316, 354, 325

[56] References Cited

U.S. PATENT DOCUMENTS

| 189,120 | 4/1877 | McClintock | 403/316 |
| 630,514 | 8/1899 | Muller | 403/316 |
| 2,267,802 | 12/1941 | Purdy | 403/316 |
| 2,399,133 | 4/1946 | Midling | 403/316 |

FOREIGN PATENT DOCUMENTS

| 1431362 | 1/1966 | France | 403/325 |
| 917187 | 1/1963 | United Kingdom . | |

Primary Examiner—Anthony Knight
Attorney, Agent, or Firm—Laubscher & Laubscher

[57] ABSTRACT

A device for coupling two shafts rotatable about a common axis comprises teeth at the end of one shaft and notches at the end of the other shaft. The teeth and the notches have conjugate profiles and inclined sides so that the teeth engage in the notches. An axial retention sleeve surrounds the ends of the two shafts and has bearing end faces substantially perpendicular to the common axis. A compression spring bears on one of the bearing end faces of the sleeve coupled axially to one of the two shafts and presses the ends of the two shafts against the other bearing end face of the sleeve.

19 Claims, 3 Drawing Sheets

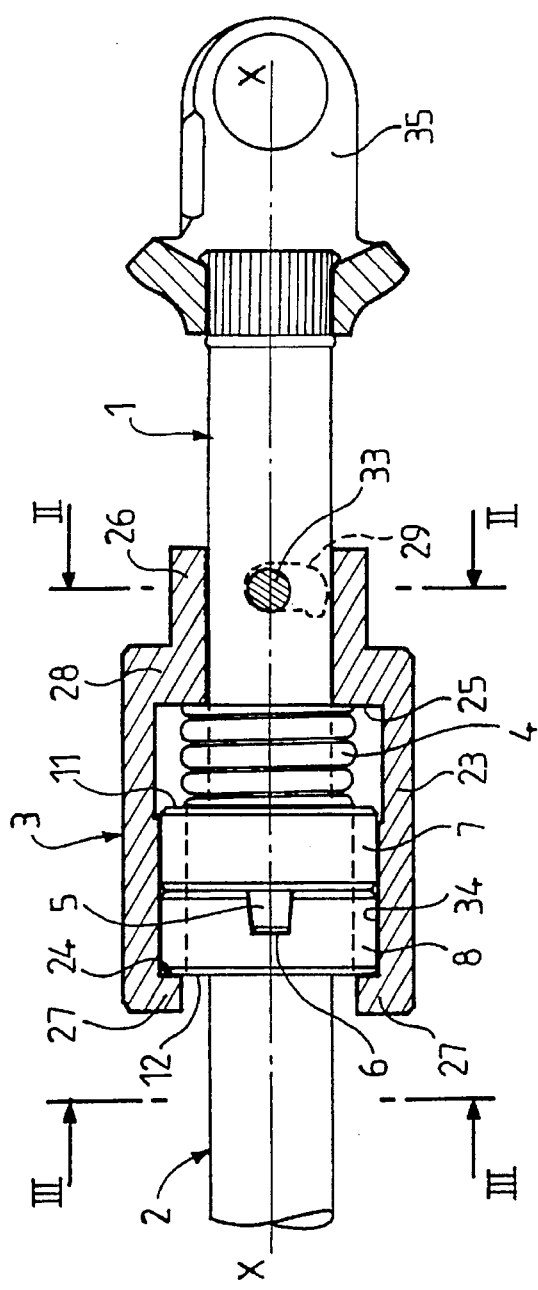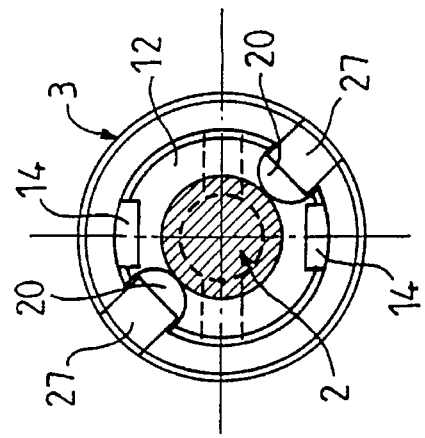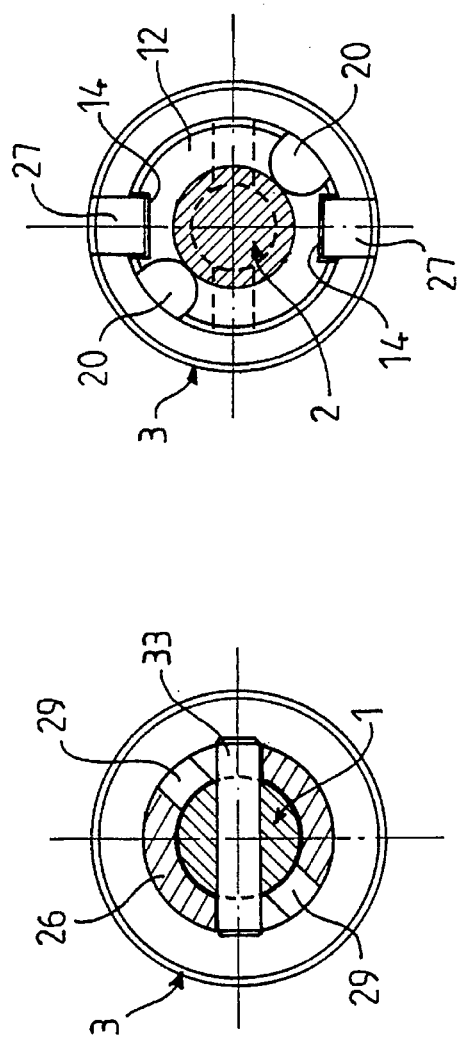

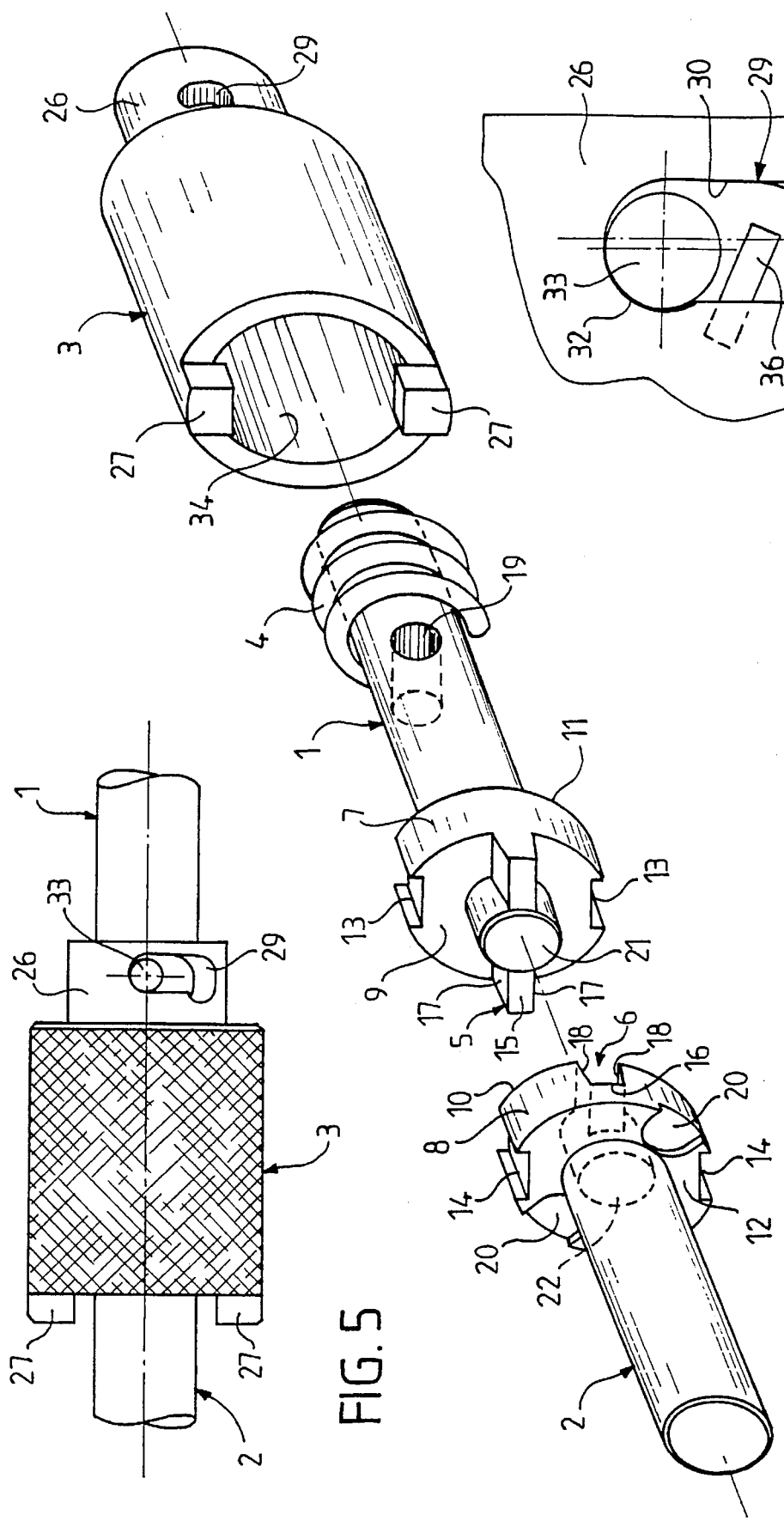

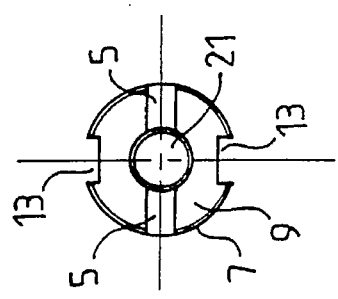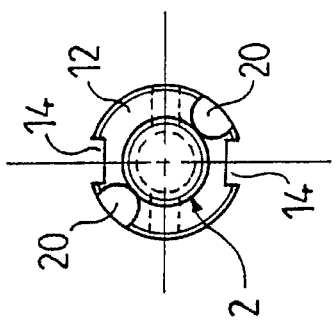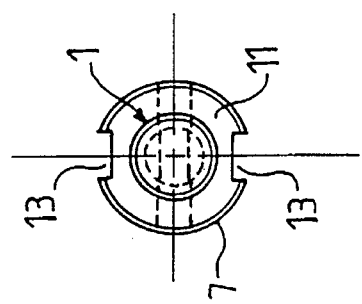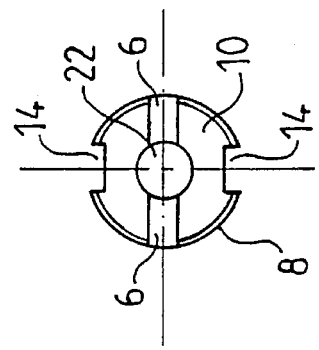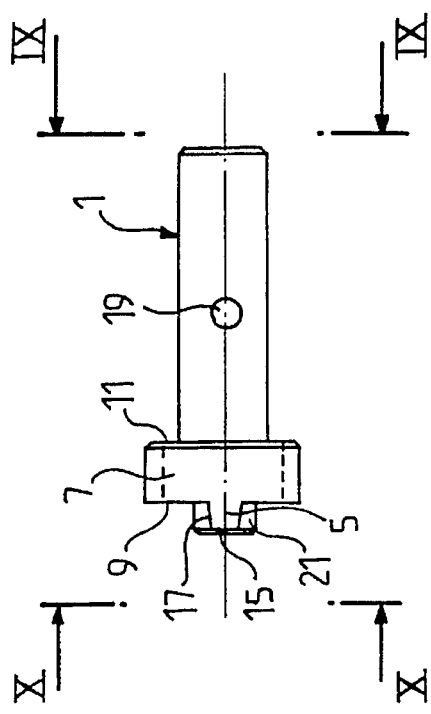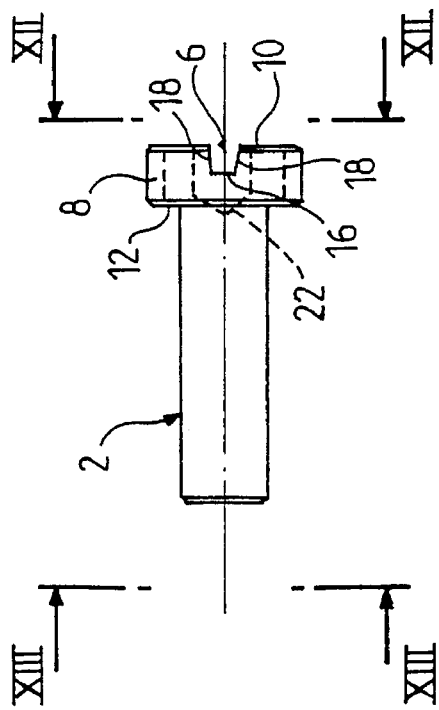

DEVICE FOR COUPLING TWO SHAFTS

BACKGROUND OF THE INVENTION

1. Field of the Invention

The present invention concerns a device for coupling two shafts rotatable about a common axis.

The coupling device of the invention is more particularly intended to be fitted to an automobile vehicle steering column.

2. Description of the Prior Art

Prior art devices for coupling two automobile vehicle steering column shafts utilize clearance take-up systems requiring external input of energy by a spring or by the operator. Taking up the clearance of the system requires a very large input of energy and therefore a very strongly prestressed spring, which is difficult to fit.

OBJECT OF THE INVENTION

The main object of this invention is to propose a device for coupling two coaxial shafts which is easy to fit in the shortest possible time whilst guaranteeing correct take-up of clearance and holding of the coupling in place.

SUMMARY OF THE INVENTION

Accordingly, a coupling device for coupling two shafts rotatable about a common axis comprises at least one tooth and at least one notch on the ends of the two shafts and extending in a plane substantially perpendicular to the common axis. The tooth and the notch have conjugate profiles so that the tooth engages in the notch to rotational couple the ends of the two shafts. According to another embodiment, the shafts may include two diametrally opposed teeth and two diametrally opposed notches.

An axial retention sleeve surrounds the ends of the two shafts and has bearing end faces substantially perpendicular to the common axis. A spring means such as a compression spring is located inside the sleeve and bears on one of the bearing end faces of the sleeve coupled axially to one of the two shafts and presses the ends of the two shafts against the other bearing end face of the sleeve.

The coupling device comprises a system for locking the spring means adapted to hold the latter in place during interengagement of the two shafts, i.e., of the tooth into the notch.

According a preferred embodiment of the invention, the locking system comprises a hub at an end of the sleeve having the bearing end face against which the spring means bears. The hub includes at least one slot so that a pin mounted in the corresponding shaft projects through the slot. The hub of the sleeve may have two diametrally opposed slots cooperating with the pin. Preferably the slot includes a circular sector extended at one end by an axial section for releasing the locking system to enable the spring means to press the two shafts together by bearing on the sleeve. The coupling device further comprises an axial non-return system which, according a preferred embodiment, includes a stop pin mounted in the slot.

According to a notably interesting aspect of the invention, the bearing end face of the sleeve for the ends of said two shafts is constituted by two protusions in the form of bearing lugs which on diametrally opposed. The end of each shaft has a circular plate having two diametrally opposed axial grooves forming a passing for the two bearing lugs of the sleeve. In this embodiment, it is advantageous to provide for a particular feature of the slot of the locking means which is included in the sleeve hub. This feature is that the slot in the sleeve hub has a circular imprint at another end of the circular sector opposite the axial section to ensure a holding of the locking system.

To facilitate fitting, the coupling device comprises an indexing system consisting in the determination of the axial length of the circular plate bearing on the bearing lugs so that the other circular plate being in place with the locking system set with the pin in the shaft. In the circular imprint of the slot at another end of the sleeve opposite the axial section, the circular plate has its axial grooves still engaged with the bearing lugs so that the two circular plates are offered up to each other appropriately on offering up the tooth to the notch, as the two bearing lugs are still being engaged into the axial grooves of the circular plate when the tooth is being engaged into the notch.

The coupling device may also comprise a system for holding the coupling device in a closed position. The holding system comprises two imprints which are diametrally opposed and which are located on the outside face of the circular plate thereby accommodating the two bearing lugs of the sleeve to hold the assembly of the coupling device in the closed position.

The coupling device according to invention may comprise a centering system to align the two shafts one with respect of the other. The centering system comprises a circular end-piece at the end of one of the shafts adapted to fit into a circular housing at the end of the other of the shafts.

According to another embodiment of the invention, the centering device comprises the circular plates, the outside circular faces of which fit in an inside cylindrical recess of the sleeve.

The invention relates also to a method for coupling ends of first and second shafts rotatable about a common axis. The method comprises the steps of mounting a sleeve about the first shaft containing a compression spring bearing against the first end of the sleeve, connecting the first end of the sleeve to the first shaft by means of a locking system in a locked position, axially engaging the end of the second shaft with the end of the first shaft until a tooth at the end of one of the first and second shafts is applied into a notch at the end of the other of the first and second shafts, and rotating the sleeve about the ends of the first and second shafts so that said locking system be released and two bearing lugs on the second end of the sleeve engage in two imprints at the end of the second shaft to hold a coupling between the ends of the shafts in a closed position.

The step of connecting includes passing a pin which through a diametral hole of the first shaft and two slots in the first end of the sleeve. Each of the slots includes a circular sector extended at one end by an axial section and terminates at the other end in a circular imprint. The compression spring is at the locked position when said pin is engaged in the circular imprint of each of the slots.

The step of rotating causes the circular section of each of the slots to be crossed by the pin until the pin be engaged in the axial section of each of the slots, which corresponds to the closed position of the coupling. Simultaneously the two bearing lugs of the sleeve are engaged in the two imprints on an outside face of a circular plate at the end of the second shaft thereby holding the closed position of the coupling.

The coupling device of the invention thus has the advantage of being quick to fit, without effort, easily and without any clearance either when brand new or after use. Additionally, once made, the coupling is guaranteed mechanically. Finally, the components used are relatively simple and therefore of relatively low cost.

BRIEF DESCRIPTION OF THE DRAWINGS

The foregoing and other objects, features and advantages of the invention will be apparent from the following detailed description of several embodiments of the invention with reference to the corresponding accompanying drawings in which:

FIG. 1 is an overall axial view partly in section of the coupling device of the invention showing the sleeve in axial section;

FIG. 2 is a sectional view taken along the line II—II in FIG. 1;

FIG. 3 is a sectional view taken along the line III—III in FIG. 1, the coupling device being in a "shipping" position as in FIG. 1;

FIG. 4 is a sectional view similar to FIG. 3 but showing the coupling device in a closed position;

FIG. 5 is an axial view similar to FIG. 1 but showing the outside of the sleeve;

FIG. 6 shows in more detail part of FIG. 5;

FIG. 7 is a perspective view of the coupling device as a whole prior to fitting;

FIG. 8 is an axial view of one of the shafts with teeth to be coupled;

FIG. 9 is a rear view taken in the direction of the arrows IX in FIG. 8;

FIG. 10 is a face view taken in the direction of the arrows X in FIG. 8;

FIG. 11 is an axial view of the other shaft with notches to be coupled;

FIG. 12 is a face view taken in the direction of the arrows XII in FIG. 11; and

FIG. 13 is a rear view taken in the direction of the arrows XIII in FIG. 11.

DESCRIPTION OF THE PREFERRED EMBODIMENTS

The coupling device of the invention is designed to link two shafts denoted 1 and 2 which are rotatable about a common axis X—X. The embodiment of the invention shown in the figures relates to a coupling device specifically intended for an automobile vehicle steering column. The shaft 1 is the driving shaft and is integrated with the steering column by means of a universal joint jaw 35. The shaft 2 is the driven shaft and is integrated with the rod of the pinion of the steering box.

The device for coupling the two shafts 1 and 2 is shown in its entirety in FIGS. 1, 5 and 7. It includes a means for rotationally coupling the two shafts 1 and 2, associated with axial retention means.

The rotational coupling means essentially comprises:

at least one tooth 5 which is integral with the end of one of the two shafts to be coupled, the shaft 1 in the example shown in the figures, this tooth 5 being in a plane substantially perpendicular to the common axis X—X; and at least one notch 6 made at the end of the other shaft 2 to be driven, in a plane substantially perpendicular to the common axis X—X.

The tooth 5 and the notch 6 have conjugate profiles with sides 17 inclined to the top 15 of the tooth 5 and with sides 18 inclined to the bottom 16 of the notch 6. The sides 17 of the tooth 5 bear on the corresponding sides 18 of the notch 6 after axial engagement of the shaft 2 relative to the shaft 1. The sides 17 and 18 are then held in place by the effect of the axial retention means.

The axial retention means includes a sleeve 3 and spring means constituted by a compression spring 4 mounted inside the sleeve 3.

The driving shaft 1 has at the end a circular plate 7 with an inside face 9 and an outside face 11. Two diametrally opposed teeth 5 are formed on the inside face 9. The driven shaft 2 also has a circular plate 8 with an inside face 10 and an outside face 12. There are two diametrally opposed notches 6 on the inside face 10 the profile of which corresponds to the profile of the corresponding teeth 5 protruding on the inside face 9 of the circular plate 7 on the shaft 1.

The sleeve 3 has a cylindrical body 23 with a rear wall 28 at a first end and two bearing lugs 27 at a second end. The sleeve rear wall 28 is extended by a hub 26. The cylindrical body 23 has an inside cylindrical recess 34 and two bearing faces 24 and 25 perpendicular to the axis of the sleeve. The bearing face 24 is constituted by the inside faces of the two bearing lugs 27. The bearing face 25 is the inside face of the rear wall 28 of the sleeve. The two bearing lugs 27 are constituted by two diametrally opposed profusions extending perpendicular to the axis of the sleeve, as shown in FIG. 3.

The circular plates 7 and 8 have dimensions that correspond to the inside cylindrical recess 34 of the sleeve 3. The circular plate 7 on the shaft 1 includes two diametrally opposed axial grooves 13 the axes of which are in a plane perpendicular to the teeth 5 and the dimensions of which correspond to the two bearing lugs 27. Likewise, the circular plate 8 on the shaft 2 includes two diametrally opposed axial grooves 14 the axes of which are in a plane perpendicular to the notches 6 and the dimensions of which correspond to the dimensions of the two bearing lugs 27. The sleeve 3 is coupled axially to the shaft 1 by a pin 33 mounted in a diametral hole 19 of the shaft 1 and passing through the hub 26 of the sleeve 3, as shown in FIG. 2.

The spring means included in the axial retention means comprises a compression spring 4. The sleeve 3 surrounds the ends of the two shafts 1 and 2, i.e. the circular plates 7 and 8, and the compression spring 4 which is mounted about the shaft 1. The compression spring 4 is applied against the bearing face 25 of the rear wall 28 of the sleeve 3 and presses the two circular plates 7 and 8, with the teeth 5 inserted in the notches 6, against the other bearing face 24 of the sleeve 3 which is constituted by the inside face of the two bearing lugs 27 which are in the closed position as shown in FIG. 4.

The spring means, i.e. the compression spring 4, includes a locking system which holds the compression spring 4 in place during interengagement of the two shafts 1 and 2. This locking system comprises two diametrally opposed slots 29 made in the hub 26 of the sleeve 3 as shown in FIG. 2. These two slots 29 accommodate from the shaft 1 the pin 33 which projects through the two slots 29.

Referring to FIG. 6, each of the slots 29 includes a circular sector 30 which is coaxial with the sleeve and which is extended at one end by an axial section 31 and which terminates at the other end in a circular imprint 32. Each axial section 31 can release the locking system to allow the compression spring 4 to press the two circular plates 7 and 8 together by pressing on the sleeve 3 through the intermediary of the two bearing lugs 27, which corresponds to the closed position of FIG. 4.

When the assembly mounted on the shaft 1 is in the shipping position, the pin 33 is at the other end of the circular sector 30 in the circular imprint 32 so as to retain the locking system, as shown in FIGS. 1, 2, 3 and 6.

The coupling device of the invention further includes an axial non-return system constituted by a stop pin 36 in the slot 29, as shown in FIG. 6.

To facilitate fitting the coupling device, the latter includes an indexing system. This indexing system is constituted by the determination of the axial length of the circular plate 8 on the shaft 2 from the assembly mounted on the shaft 1 when the latter assembly is in the shipping position. When the assembly on the shaft 1 is in the shipping position, the locking system is set with the pin 33 in the shaft 1 bearing in the circular imprints 32 of the slots 29 in the sleeve 3. The axial length of the circular plate 8 is determined so that the two axial grooves 14 of said plate 8 are still engaged with the bearing lugs 27 when the teeth 5 are offered up to the corresponding notches 6.

The coupling device includes a centering system for aligning the two shafts 1 and 2 correctly as shown in FIGS. 7, 10 and 12. This centering system comprises in a circular end-piece 21 at the end of the shaft 1. This circular end-piece 21 is adapted to enter a circular housing 22 made at the end of the other shaft 2.

In another embodiment of the centering system of the invention, the circular outside face of each of the circular plates 7 and 8 on the respective shafts 1 and 2 fits into the face of the inside cylindrical recess 34 of the sleeve 3.

When the coupling device is in the closed position, there is provided a system for holding the coupling device in the closed position. To this end, the outside face 12 of the circular plate 8 on the shaft 2 has two diametrally opposed imprints 20. The dimensions of these imprints 20 correspond to the dimensions of the two bearing lugs 27. As can be seen in FIGS. 3 and 4, when the coupling device goes from the shipping position to the closed position, the sleeve 3 turns relative to the shafts 1 and 2 and the two bearing lugs 27 engage in the corresponding two imprints 20, which holds the coupling device in the closed position.

The method of fitting the device for coupling two shafts 1 and 2 rotatable about the common axis X—X including rotational coupling means associated with axial retention means is characterized in that the shaft 1 carrying the compression spring 4 is inserted in the sleeve 3. The shaft 1 is then connected to the sleeve 3 by the pin 33 mounted in the hole 19 in the shaft 1 by passing through the two slots 29 in the hub 26 of the sleeve 3. Each of the slots 29 includes the sector 30 which is extended at one end by the axial section 31 and the other end of which terminates at the circular imprint 32. The pin 33 and the two slots 29 constitute the system for locking the compression spring 4. The compression spring 4 is in a locked position when the pin 33 is engaged in the circular imprint 32 of each of the slots 29, which corresponds to the shipping position. The locking system for the compression spring 4 is in a freed position when the pin 33 is inserted in the axial section 31 of each of the slots 29, which corresponds to the closed position of the coupling device. The coupling device is held in this closed position by the engagement of the two bearing lugs 27 on the sleeve 3 in the imprints 20 made on the outside face 12 of the plate 8 on the corresponding shaft 2.

In the fitting method of the invention, with the sleeve 3 mounted on the shaft 1 with the compression spring 4 and the locking system is in the locked position, the other shaft 2 is inserted axially into the sleeve 3 until the sides 17 of the teeth 5 on the shaft 1 bear against the sides 18 of the corresponding notches 6 on the other shaft 2. The sides 17 and 18 are held together by the effect of the axial retention means which is operative after the arming system is freed by rotating the sleeve 3. This rotation causes the two bearing lugs 27 to turn so that they engage in the two imprints 20 made on the outside face 12 at the end of the other shaft 2, to hold the coupling device in the closed position.

What we claim is:

1. A coupling device for coupling ends of two shafts rotatable about a common axis comprising:

at least one tooth and at least one notch respectively on said ends of said two shafts and substantially extending perpendicular to said common axis, said tooth and said notch having conjugate profiles so that said tooth engages in said notch, a sleeve surrounding said ends of said two shafts and having bearing end faces substantially perpendicular to said common axis, and spring means located inside said sleeve and bearing on one of said bearing end faces of said sleeve which is coupled axially to one of the two shafts, and pressing said ends of said two shafts against the other bearing end face of said sleeve.

2. A coupling device as claimed in claim 1, comprising a system for locking said spring means adapted to hold said spring means in place during interengagement of said two shafts.

3. The coupling device claimed in claim 2 wherein said locking system comprises a hub at an end of said sleeve having said bearing end face against which said spring means bears, said hub including at least one slot so that a pin mounted in the corresponding one of said shafts projects through said slot.

4. The coupling device claimed in claim 3 wherein said slot includes a circular sector extended at one end by an axial section for releasing said locking system to enable said spring means to press said two shafts together by bearing on said sleeve.

5. A coupling device as claimed in claim 4 comprising an axial non-return system.

6. The coupling device claimed in claim 5 wherein said axial non-return system includes a stop pin mounted in said slot.

7. The coupling device as claimed in claim 4 wherein said slot in said hub has a circular imprint at another end of said circular sector opposite said axial section to ensure a holding of said locking system.

8. The coupling device claimed in claim 3 wherein said hub at an end of said sleeve has two diametrally opposed slots cooperating with said pin.

9. A coupling device as claimed in claim 3, wherein:

said bearing end face of said sleeve for said ends of said two shafts is constituted by two protusions in the form of diametrally opposed bearing lugs, and each shaft has at its end a circular plate having two diametrally opposed axial grooves forming a passing for said bearing lugs of said sleeve, and comprising an indexing system consisting in the determination of the axial length of one of said circular plates bearing on said bearing lugs so that the other circular plate being in place with said locking system set with said pin in said shaft and in a circular imprint of said slot at another end of said sleeve opposite said axial section, said one circular plate has its axial grooves still engaged with said bearing lugs so that said two circular plates are offered up to each other appropriately on offering up said tooth to said notch.

10. A coupling device as claimed in claim 9 comprising two diametrally opposed imprints on an outside face of said one circular plate for accommodating said two bearing lugs of said sleeve to thereby holding said coupling device in a closed position.

11. The coupling device claimed in claim 3 wherein said shafts respectively include two diametrally opposed teeth and two diametrally opposed notches engaging with said teeth.

12. The coupling device claimed in claim 1 wherein said spring means comprises a compression spring arranged around said one shaft.

13. The coupling device claimed in claim 1 wherein:

said bearing end face of said sleeve for said ends of said two shafts is constituted by two protusions in the form of diametrally opposed bearing lugs, and each shaft has at its end a circular plate having two diametrally opposed axial grooves forming a passing for said bearing lugs of said sleeve.

14. A coupling device as claimed in claim 13 comprising a system for holding said coupling device in a closed position.

15. A coupling device as claimed in claim 13 wherein said outside circular faces of said circular plates fit in an inside cylindrical recess of said sleeve.

16. A coupling device as claimed in claim 1 comprising a centering system.

17. A coupling device as claimed in claim 1 comprising a circular end-piece at the end of one of said two shafts adapted to fit into a circular housing at the end of the other of said two shafts.

18. A method for coupling ends of first shaft and second shaft rotatable about a common axis, comprising the steps of:

mounting a sleeve about said first shaft, said sleeve having a first end and a second end and containing a compression spring bearing against said first end of said sleeve, connecting said first end of said sleeve to said first shaft by means of a locking system in a locked position, axially engaging said end of said second shaft with said end of said first shaft until a tooth at the end of one of said first shaft and second shaft is applied into a notch at the end of the other of said first shaft and second shaft, and rotating said sleeve about said ends of said first shaft and second shaft so that said locking system be released and two bearing lugs on said second end of said sleeve engage in two imprints at said end of said second shaft to hold a coupling between said ends of said first shaft and second shaft in a closed position.

19. The method claimed in claim 18 wherein the step of connecting includes passing a pin through a diametral hole of said first shaft and two slots in said first end of said sleeve, each of said slots including a circular sector extended at one end by an axial section and terminating at the other end in a circular imprint, said compression spring being at said locked position when said pin is engaged in said circular imprint of each of said slots, and the step of rotating causes said circular section of each of said slots to be crossed by said pin until said pin be engaged in said axial section of each of said slots and said two bearing lugs of said sleeve to be engaged in said two imprints on an outside face of a circular plate at said end of said second shaft thereby holding said closed position of said coupling.

* * * * *